United States Patent [19]

Eugstar

[11] Patent Number: 5,615,601
[45] Date of Patent: Apr. 1, 1997

[54] COFFEE MAKING MACHINE HAVING A BUILT-IN COFFEE GRINDER

[75] Inventor: Arthur Eugstar, Romanshorn, Switzerland

[73] Assignee: Eugster/Frismag AG, Romanshorn, Switzerland

[21] Appl. No.: 601,862

[22] Filed: Feb. 15, 1996

[30] Foreign Application Priority Data

Feb. 17, 1995 [DE] Germany .......... 295 02 596.4

[51] Int. Cl.[6] .................................. A47J 31/42
[52] U.S. Cl. .................. 99/280; 99/286; 241/101.2
[58] Field of Search .................. 99/279, 280, 286, 99/284, 289 R, 290, 285, 295; 241/101.2; 426/433

[56] References Cited

U.S. PATENT DOCUMENTS 5,186,399  2/1993  Knepler ............... 99/286
5,267,507  12/1993  Enomoto .............. 99/286
5,367,948  11/1994  Fusco ................. 99/285
5,417,145  5/1995  Joseph ................ 99/290

Primary Examiner—Robert W. Jenkins
Attorney, Agent, or Firm—Spencer & Frank

[57] ABSTRACT

A coffee making machine assembly includes a coffee maker which has a brewing water outlet defining a brewing position thereunder. The assembly further includes a coffee mill having a grinding device spaced horizontally from the brewing water outlet. Underneath the grinding device a grinding position is defined which is horizontally spaced from the brewing position. There is also provided a filter carrier adapted to receive a filter basket; and a displacing mechanism for supporting the filter carrier and for moving the filter carrier into the grinding position or into the brewing position.

8 Claims, 1 Drawing Sheet

COFFEE MAKING MACHINE HAVING A BUILT-IN COFFEE GRINDER

CROSS REFERENCE TO RELATED APPLICATION

This application claims the priority of German Utility Model Application No. 295 02 596.4 filed Feb. 17, 1995, which is incorporated herein by reference.

BACKGROUND OF THE INVENTION

This invention relates to a coffee making machine which incorporates a coffee grinder from which the ground coffee is transferred to a filter placed in a filter carrier, a brewing water outlet positioned above the filter carrier and a plate (emplacement) for supporting a coffee-receiving receptacle underneath the filter carrier.

In household-type coffee making machines of conventional structure, a filter, placed in a filter carrier, is manually filled with ground coffee before the brewing process and the filter is positioned, in preparation for the brewing process, underneath a hot water outlet and above a coffee-receiving receptacle such as a coffee pot or a coffee cup. The filter carrier is in most cases so structured that it may be removed from the brewing position for the purpose of loading it with ground coffee and for removing the coffee grounds therefrom. Known types of filter carriers may be those which can be inserted from above, pivoted or pushed in.

Since pre-ground coffee, even if carefully stored, loses some of its aroma, coffee makers have become known which are coupled with a coffee grinder as a structural unit in such a manner that the ground coffee, obtained from coffee beans only immediately before the brewing process is, within the machine assembly, transported from the grinding mechanism to the filter, or parts of the coffee grinder itself form the filter. In structures which embody the first-named combination, coffee mills with cone or disk or roll grinding mechanisms are used. The ground coffee falls from the grinding mechanism into a receiving device and is advanced therefrom by means of a mechanical transporting device into a filter which is in the brewing position. In the above-noted second variant the grinding mechanism is positioned immediately above the filter situated in the brewing position and thus the ground coffee falls directly into the filter.

It is a common disadvantage of both solutions that the transporting device or the grinding mechanisms are exposed to the steam generated during the brewing process or the water condensate resulting therefrom. The components can be protected only by providing expensive seals or partitions.

In the embodiments in which the parts of the coffee grinder themselves form the filter, grinders with rapidly rotating impact blades are used. The bottom of the working chamber of the grinder is designed as a permanent filter and the ground coffee remains in the working chamber after the grinding process. Thereafter, the hot brewing water is guided into the working chamber over the ground coffee and flows through the permanent filter bottom into a receptacle, such as a coffee pot or a coffee cup. It is a disadvantage of this system that the structural elements of the impact grinder, that is, the working chamber, the impact blades, the seals, etc. are exposed to the brewing water and after the brewing process these components have to be cleaned of the coffee grounds externally of the machine. Further, because of the high dust proportion which is formed in a coffee ground by impact-blade grinders, the filtered coffee will not be of the best obtainable quality, particularly if permanent filters are used.

SUMMARY OF THE INVENTION

It is an object of the invention to provide an improved coffee machine/coffee grinder combination, also referred to hereafter as a coffee automat, from which the disadvantages of the earlier-described systems are eliminated, that is, the relatively sensitive components of the grinder are not exposed to water steam or condensate or brewing water during the brewing process and a high quality of filtered coffee is obtained by simple means.

This object and others to become apparent as the specification progresses, are accomplished by the invention, according to which, briefly stated, the coffee automat includes a coffee maker which has a brewing water outlet defining a brewing position thereunder. The coffee automat further includes a coffee mill having a grinding device spaced horizontally from the brewing water outlet. Underneath the grinding device a grinding position is defined which is horizontally spaced from the brewing position. There is also provided a filter carrier adapted to receive a filter; and a displacing mechanism for supporting the filter carrier and for moving the filter carrier into the grinding position or into the brewing position.

Thus, according to the invention, the filter carrier which is movable between the grinding position and the brewing position, constitutes the transporting device for the ground coffee. The movable filter carrier may either be pivotal about a rotary axis or may be shiftable by a linear slide mechanism in order to place it into the grinding position or the brewing position representing the two opposite terminal points of the motion path of the filter carrier.

According to a further feature of the invention, the filter carrier is, by means of a spring, brought from one of its two end positions into the other. The filter carrier is immobilized in one of its end positions by an arresting device and, after releasing the same, the filter carrier is moved into the other end position by the force of the spring.

According to a further feature of the invention, an abutment is provided which suddenly stops the filter carrier in the brewing position as it is moved from the grinding position. Also, in conjunction with this feature, the transporting device is so designed that in the grinding position the filter carrier is eccentrically located relative to the main vertical axis of the coffee grinder. By virtue of this arrangement, the ground coffee in the filter carrier forms a conical mound in the filter carrier which is offset relative to the vertical axis thereof, so that the coffee mound, upon sudden stopping of the transporting motion in the brewing position, changes its conical shape and assumes a horizontally more uniformly distributed configuration. In the brewing process which follows, the ground coffee is then uniformly raised at the inner surface of the filter and covers the filter with an approximately uniform layer. This fulfills a condition for brewing a tasty, well-flavored coffee.

DESCRIPTION OF THE PREFERRED EMBODIMENTS

Figure 2:
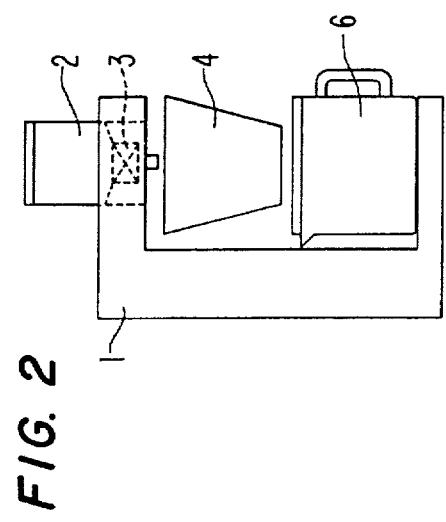
FIG. 2 is a schematic side elevational view of the structure shown in FIG. 1.
Figure 1:
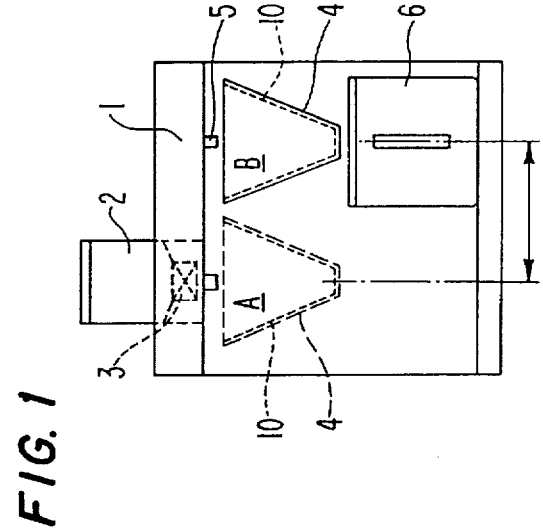
FIG. 1 is a schematic front elevational view of a preferred embodiment of the invention.

Turning to FIGS. 1 and 2, there is illustrated therein a coffee automat 1 which includes a built-in coffee grinder 2 and a hot water outlet nipple 5. In FIG. 1, a filter carrier 4 is shown in broken lines in the grinding position A underneath the coffee mill 2 and its grinding mechanism 3. During the grinding process the ground coffee falls directly into a filter 10 placed in the filter carrier 4.

In FIG. 1 the filter carrier 4 is shown in full lines in the brewing position B underneath the brewing water outlet 5 of a conventional hot water generator (not shown) and above a coffee pot 6. By virtue of the spatial separation between the coffee grinder and the coffee making assembly, that is, between the grinding position and the brewing position, water steam is prevented from gaining access to the grinding mechanism 3 to thus avoid corrosion or sticking of coffee grind residues due to condensated water.

Figure 5:
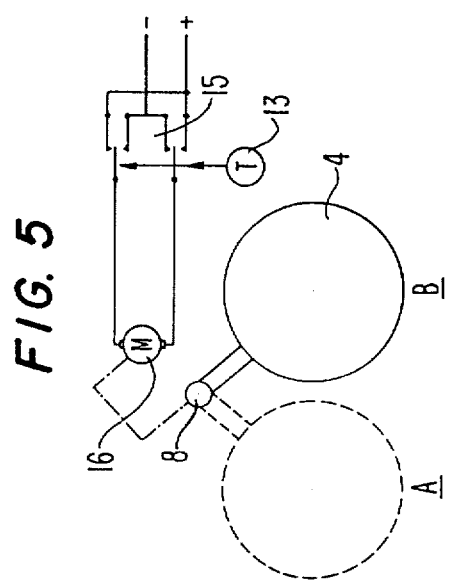
FIG. 5 is a schematic top plan view of another embodiment of the transporting device according to the invention.

The pivotal or translatory motion of the filter carrier 4 between the loading position A and the brewing position B may be effected either by hand or semiautomatically by means of a biased spring 9 (FIG. 4) or fully automatically by means of a setting motor, in conjunction with program and control devices (FIG. 5).

Figure 4:
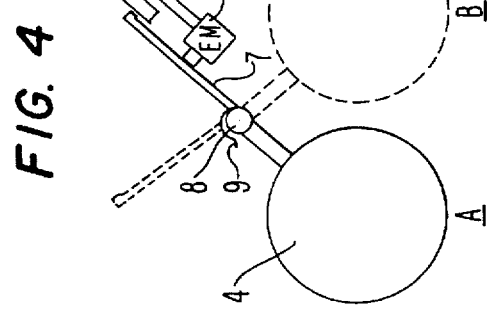
FIG. 4 is a schematic top plan view of an embodiment of a transporting device according to the invention.

With particular reference to FIG. 4, an arm 7 is affixed to and extends radially from the filter carrier 4 and is, at a location between its two opposite ends, pivotally supported by a stationarily held pin 8. By virtue of this arrangement the filter carrier 4 may be manually swung into the grinding position A, whereby the spring 9 is tensioned. FIG. 4 illustrates the filter carrier 4 in solid lines in the grinding position A. As the filter carrier 4 reaches the grinding position A, a contact 11 of an electric circuit including a holding magnet 14 is closed and thus the holding magnet 14 is energized. The holding magnet 14 immobilizes the arm 7 and thus maintains the filter carrier 4 in the grinding position A until a control contact 12 of the electric circuit is opened by means of a timer 13 or by actuating components controlled by the coffee grinder. After such a release of the filter carrier 4, the latter swings into the brewing position B by virtue of the force derived from the tensioned spring 9. FIG. 4 illustrates the filter carrier 4 in broken lines in the brewing position B.

According to the embodiment shown in FIG. 5, the filter carrier 4 is coupled to a motor 16 for displacing the filter carrier 4 into the grinding position A (shown in broken lines) or into the brewing position B (shown in solid lines). The activating circuit of the motor 16 includes a timer 13 which may be programmed to open and close the circuit contacts 15 at desired moments for displacing the filter carrier 4 by the motor 16 into the grinding position A or the brewing position B.

The grinding step is performed only when the filter carrier 4 is situated underneath the grinding mechanism 3, and the brewing process is performed only when the filter carrier 4 is situated underneath the hot water outlet 5 and a receptacle 6 stands underneath the filter carrier 4. Appropriate and conventional switches may be provided which sense the presence or absence of the filter carrier 4 and/or the vessel 6 to allow or prevent operation of the respective circuit.

As an example of the program execution of the transporting devices shown in FIGS. 4 and 5, the following example is given:

The coffee grinder 2 is loaded with coffee beans and the coffee maker 1 is filled with water, for example, in the evening. The coffee automat is programmed for the following morning to execute the following steps:

Pivoting the filter carrier into the grinding position A underneath the grinding mechanism 3;

Performing the grinding process with quantity or time control;

Pivoting the filter carrier 4 into the brewing position B underneath the brewing water outlet 5; and Performing the brewing process.

Figure 3:
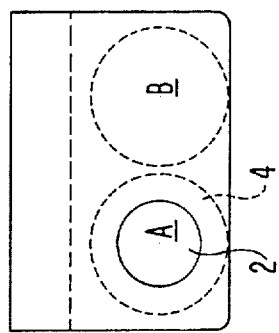
FIG. 3 is a schematic top plan view of a filter carrier showing alternate positions.
Figure 6:
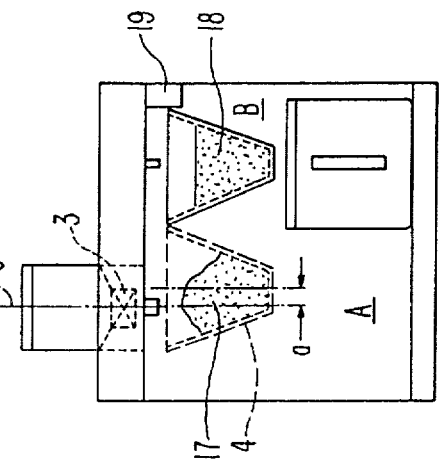
FIG. 6 is a schematic front elevational view of another preferred embodiment of the invention.

The embodiment of the invention illustrated in FIG. 6 differs from the earlier-described embodiment in the following features:

In the loading or grinding position A the filter carrier 4 is not in alignment with the vertical principal axis C of the grinder 3, but is offset therefrom by a distance a. By virtue of this arrangement, during the grinding operation, the ground coffee accumulates in the filter 10 in a cone-shaped mound 17 that is offset relative to the center of the filter carrier 4. If subsequently the filter carrier 4 is moved into the brewing position B and is suddenly stopped in its motion by an abutment 19, due to inertia the ground coffee mound changes its conical shape and assumes a configuration 18 having a substantially even upper surface. This configuration offers a satisfactory condition for a uniform welling of the ground coffee inside at the filter at the beginning of the brewing process.

It will be understood that the above description of the present invention is susceptible to various modifications, changes and adaptations, and the same are intended to be comprehended within the meaning and range of equivalents of the appended claims.

What is claimed is:

1. A coffee automat comprising (a) a coffee maker including a brewing water outlet defining a brewing position thereunder;

(b) a coffee mill having a grinding device horizontally spaced from said brewing water outlet; said grinding device defining a grinding position thereunder; said grinding position being horizontally spaced from said brewing position;

(c) a filter carrier adapted to receive a filter basket; and (d) displacing means for supporting said filter carrier and for moving said filter carrier for selectively assuming one of said positions.

2. The coffee automat as defined in claim 1, wherein said displacing means comprises a pivot supported in the coffee making machine; said filter carrier being pivotally supported on said pivot for swinging motions between said grinding position and said brewing position.

3. The coffee automat as defined in claim 1, wherein said displacing means comprises (a) a spring continuously urging said filter carrier into a first of said grinding and brewing positions;

(b) manually engageable means attached to said filter carrier for manually moving said filter carrier from said first position into a second of said grinding and brewing positions; and (c) retaining means for maintaining said filter carrier in said second position for a predetermined period.

4. The coffee automat as defined in claim 3, wherein said retaining means comprises an electromagnetic circuit including (a) an electromagnet located to be in an effective range when said filter carrier is in said second position;

(b) means carried by said filter carrier for closing the electromagnetic circuit when said filter carrier assumes said second position in the course of a movement from said first position, whereby said filter carrier is held in said second position by magnetic forces; and (c) timer means for opening said electromagnetic circuit, after a predetermined lapse of time from the closing of said electromagnetic circuit, by said means carried by said filter carrier, whereby said filter carrier is released by said electromagnet and is moved into said first position by said spring.

5. The coffee automat as defined in claim 1, wherein said displacing means comprises (a) an electric circuit including an electric motor drivingly connected to said filter carrier for moving said filter carrier between said grinding and brewing positions; and (b) timer means for energizing said motor for moving said filter carrier at a predetermined moment from a first of said grinding and brewing positions into a second of said grinding and brewing positions, for maintaining said filter carrier in said second position and for moving said filter carrier into said first position after a predetermined lapse of time from movement of said filter carrier into said second position.

6. The coffee automat as defined in claim 1, wherein said grinding mechanism has a central vertical axis and said filter, when in said grinding position, is located horizontally offset relative to said axis; further comprising means for abruptly stopping said filter carrier in said brewing position when moved from said grinding position.

7. The coffee automat as defined in claim 6, wherein said means for abruptly stopping said filter carrier comprises an abutment situated in said brewing position in a travel path of said filter carrier.

8. The coffee automat as defined in claim 1, further comprising manually engageable means connected to said filter carrier for manually displacing said filter carrier between said grinding and brewing positions.

* * * * *

UNITED STATES PATENT AND TRADEMARK OFFICE
CERTIFICATE OF CORRECTION

PATENT NO. : 5,615,601
DATED      : April 1, 1997
INVENTOR(S) : Arthur Eugster

It is certified that error appears in the above-indentified patent and that said Letters Patent is hereby corrected as shown below:

On the title page, item [75], the inventor's last name should read --Eugster--.

Signed and Sealed this

Twenty-second Day of July, 1997

Attest:

BRUCE LEHMAN

*Attesting Officer*          *Commissioner of Patents and Trademarks*